US009862416B2

(12) United States Patent
Imai et al.

(10) Patent No.: US 9,862,416 B2
(45) Date of Patent: Jan. 9, 2018

(54) AUTOMATIC PARKING CONTROL DEVICE, AND PARKING ASSISTANCE DEVICE

(71) Applicant: Clarion Co., Ltd., Saitama-shi, Saitama (JP)

(72) Inventors: Masato Imai, Tokyo (JP); Takashi Okada, Tokyo (JP); Masao Sakata, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 15/031,579

(22) PCT Filed: Oct. 22, 2014

(86) PCT No.: PCT/JP2014/078122
§ 371 (c)(1),
(2) Date: Apr. 22, 2016

(87) PCT Pub. No.: WO2015/060354
PCT Pub. Date: Apr. 30, 2015

(65) Prior Publication Data
US 2016/0272244 A1     Sep. 22, 2016

(30) Foreign Application Priority Data

Oct. 23, 2013   (JP) ................................ 2013-220248

(51) Int. Cl.
*B62D 15/02*     (2006.01)
*B60K 31/00*     (2006.01)
*G08G 1/16*      (2006.01)

(52) U.S. Cl.
CPC ...... *B62D 15/0285* (2013.01); *B60K 31/0008* (2013.01); *G08G 1/166* (2013.01); *G08G 1/168* (2013.01)

(58) Field of Classification Search
CPC ............ B62D 15/0285; B60K 31/0008; G08G 1/166; G08G 1/168
See application file for complete search history.

(56) References Cited

U.S. PATENT DOCUMENTS

| 6,084,508 | A  | * | 7/2000 | Mai ......................... | B60T 7/22 340/435 |
| 6,624,747 | B1 | * | 9/2003 | Friederich .......... | B60K 31/0008 180/271 |

(Continued)

FOREIGN PATENT DOCUMENTS

| JP | 2000-276696 A | 10/2000 |
| JP | 2005-35498 A  | 2/2005  |

(Continued)

OTHER PUBLICATIONS

International Search Report (PCT/ISA/210) issued in PCT Application No. PCT/JP2014/078122 dated Jan. 27, 2015 with English translation (Four (4) pages).

(Continued)

*Primary Examiner* — Tuan C To
(74) *Attorney, Agent, or Firm* — Crowell & Moring LLP

(57) ABSTRACT

An automatic parking control device performs steering control and speed control so that a subject vehicle moves along a target path toward a recognized parking space; when an obstacle that is approaching the subject vehicle has been detected, calculates a collision position at which the subject vehicle will collide with the obstacle; on the basis of a margin distance that is set according to the driving behavior of the subject vehicle and the collision position, calculates a stop position upon the target path that is set before the collision position by the margin distance; and performs speed control so that the subject vehicle stops at the stop position that has been calculated.

10 Claims, 12 Drawing Sheets

(56) References Cited

U.S. PATENT DOCUMENTS

| | | | |
|---|---|---|---|
| 8,686,843 B2* | 4/2014 | Schiebahn | B60Q 9/004 340/436 |
| 2002/0135467 A1 | 9/2002 | Koike | |
| 2004/0039632 A1* | 2/2004 | Han | G06Q 20/32 705/13 |
| 2005/0035879 A1* | 2/2005 | Gotzig | B60Q 9/006 340/932.2 |
| 2009/0309970 A1* | 12/2009 | Ishii | B60R 1/00 348/143 |
| 2010/0033348 A1* | 2/2010 | Kawabata | B60R 1/00 340/932.2 |
| 2010/0217483 A1* | 8/2010 | Matsuno | G08G 1/168 701/36 |
| 2011/0087406 A1* | 4/2011 | Barth | B62D 15/027 701/41 |
| 2011/0273310 A1* | 11/2011 | Kadowaki | B62D 15/0285 340/932.2 |
| 2012/0013485 A1 | 1/2012 | Pampus et al. | |
| 2012/0287279 A1* | 11/2012 | Tanaka | B62D 15/0275 348/148 |
| 2013/0024049 A1* | 1/2013 | Yoshioka | B62D 1/00 701/2 |
| 2013/0096816 A1* | 4/2013 | Takano | B62D 15/0265 701/400 |
| 2013/0151060 A1* | 6/2013 | Lee | B62D 15/0285 701/25 |
| 2013/0265175 A1* | 10/2013 | Kang | G08G 1/168 340/932.2 |
| 2013/0289825 A1* | 10/2013 | Noh | B62D 15/0285 701/42 |
| 2014/0067207 A1* | 3/2014 | Noh | G08G 1/168 701/41 |
| 2014/0244151 A1 | 8/2014 | Matsubara et al. | |

FOREIGN PATENT DOCUMENTS

| | | |
|---|---|---|
| JP | 2007-125981 A | 5/2007 |
| JP | 2007-230327 A | 9/2007 |
| JP | 2008-210036 A | 9/2008 |
| JP | 2011-79372 A | 4/2011 |
| JP | 2013-82376 A | 5/2013 |
| JP | 2013-203348 A | 10/2013 |
| WO | WO 2013/051082 A1 | 4/2013 |

OTHER PUBLICATIONS

Japanese-language Written Opinion (PCT/ISA/237) issued in PCT Application No. PCT/JP2014/078122 dated Jan. 27, 2015 (Six (6) pages).

European Search Report issued in counterpart European Application No. 14856148.3 dated Jun. 12, 2017 (eight pages).

* cited by examiner

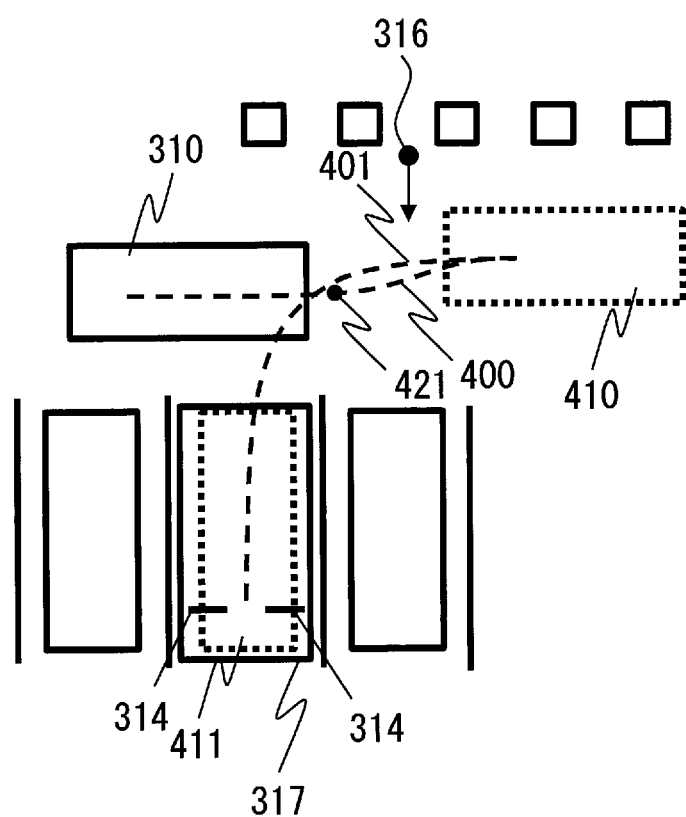

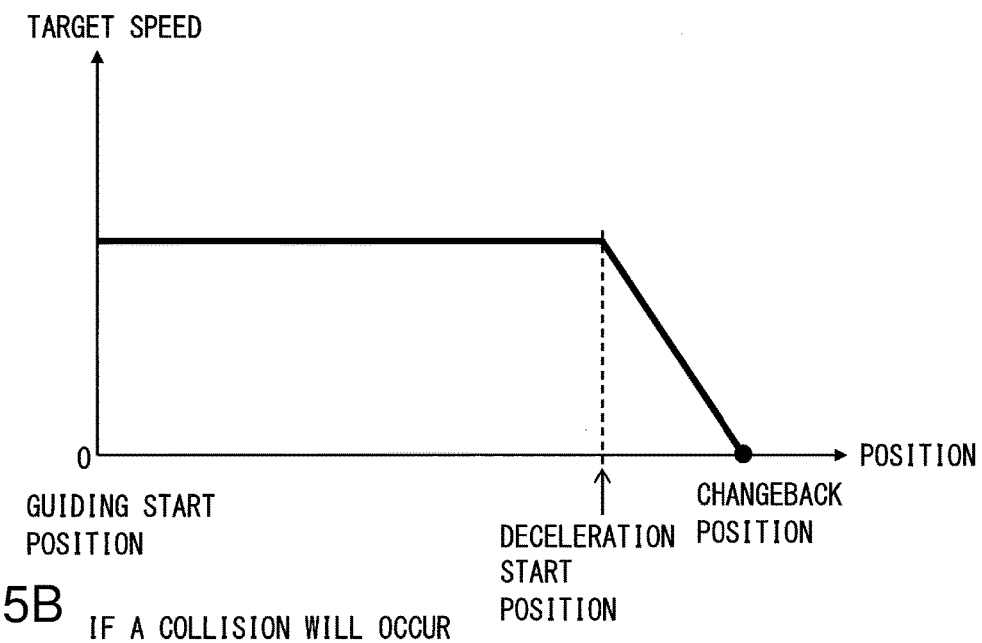
FIG. 5A  IF NO COLLISION WILL OCCUR
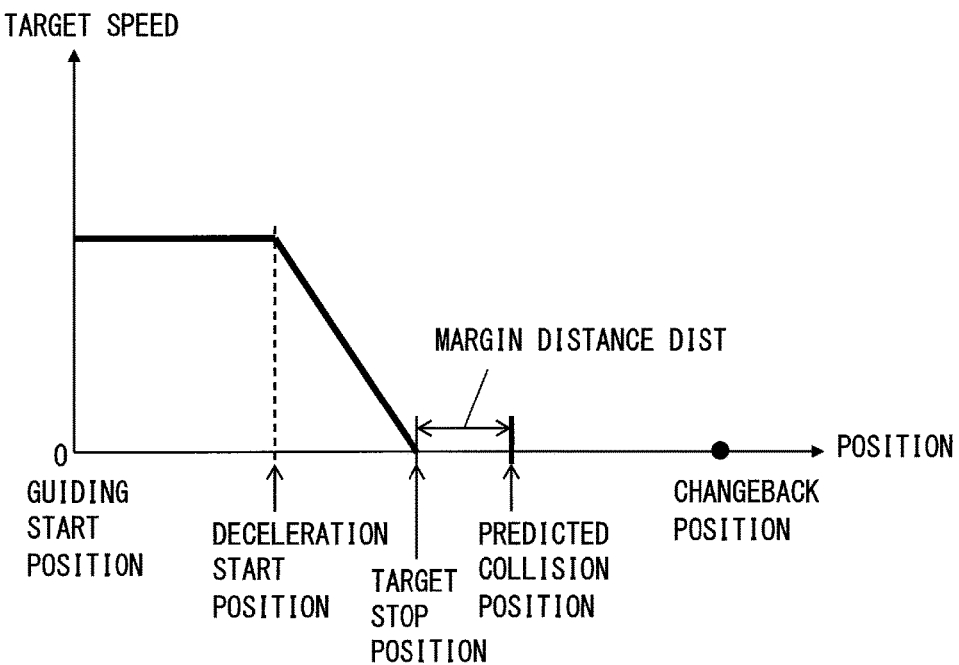
FIG. 5B  IF A COLLISION WILL OCCUR

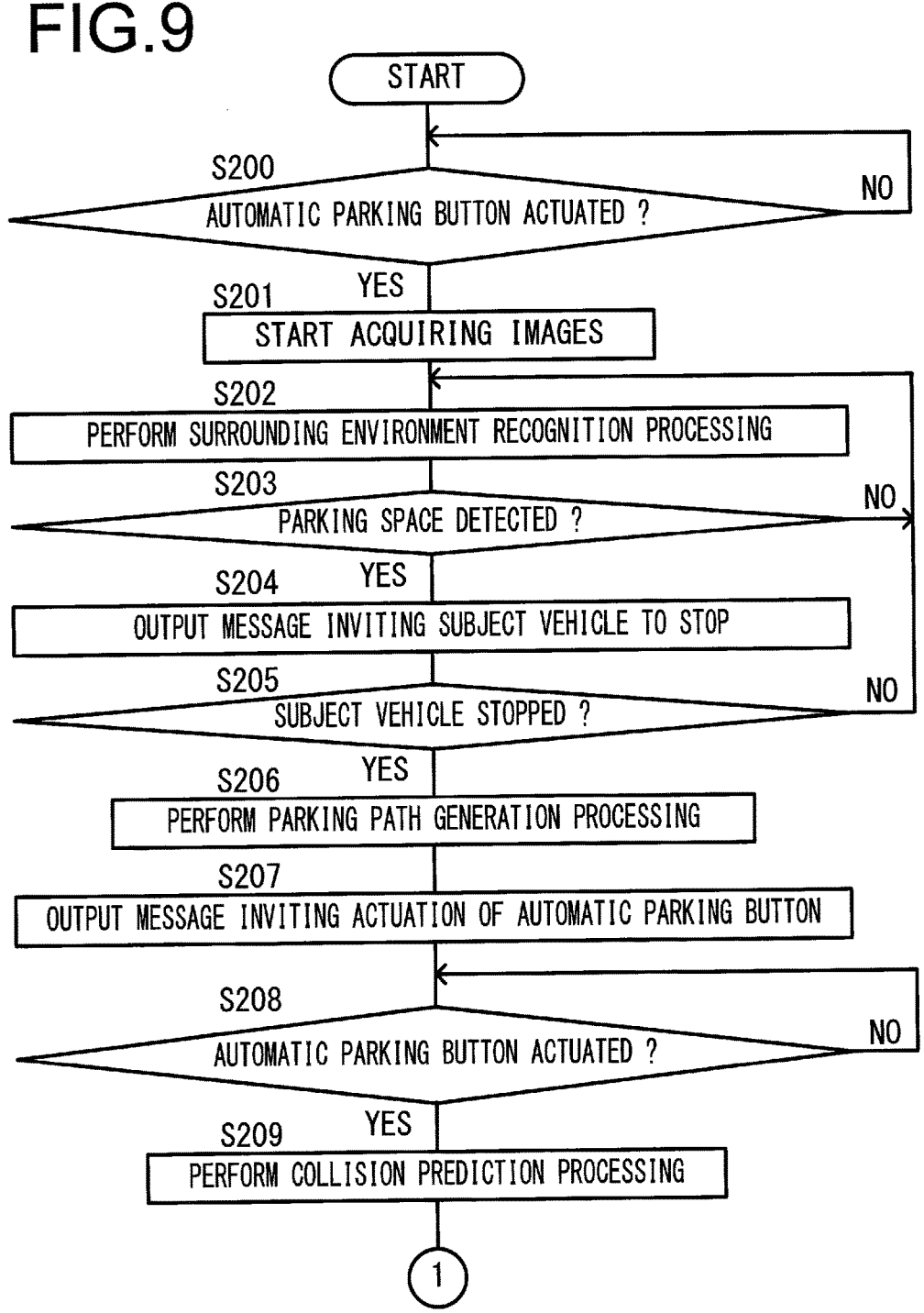

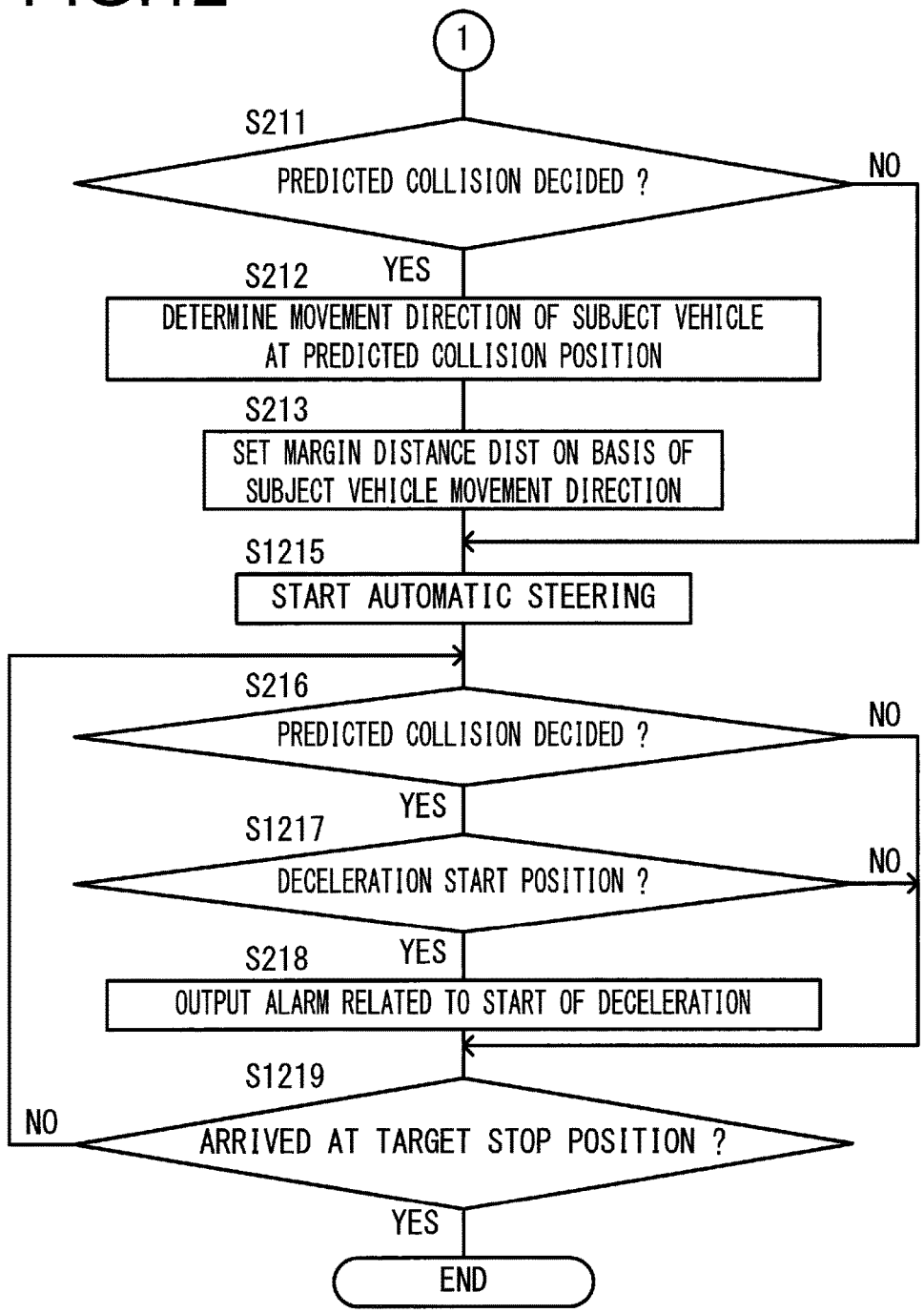

AUTOMATIC PARKING CONTROL DEVICE, AND PARKING ASSISTANCE DEVICE

TECHNICAL FIELD

The present invention relates to an automatic parking control device that guides a vehicle to a target parking position, and to a parking assistance device that assists driving to a target parking position.

BACKGROUND ART

There is a per se known technique (refer to Patent Documents #1 and #2) in which a path to a target parking position is set, automatic steering is performed or steering commands are issued in order for the subject vehicle to perform movement along this path, and the speed of the vehicle is controlled so as to be less than or equal to an upper limit for vehicle speed.

CITATION LIST

Patent Literature

Patent Document #1: Japanese Laid-Open Patent Publication 2013-82376
Patent Document #2: Japanese Laid-Open Patent Publication 2011-79372

SUMMARY OF INVENTION

Technical Problem

When a vehicle is to be parked, sometimes an obstacle such as another parked vehicle, a wall, a pedestrian or the like may be present in its surroundings. If it is predicted that the subject vehicle will collide with such an obstacle during automatic parking control for automatically controlling the vehicle to the target parking position, then, for safety, it is required that the subject vehicle should be stopped while leaving a certain distance between it and the obstacle.

A driver becomes more cautious when performing parking by causing the subject vehicle to move backward than when causing it to move forward, since the view from the driver toward the rear of the subject vehicle includes a lot of blind spots. If, without consideration being given to this state of mind of the driver, the distance left between the subject vehicle and an obstacle at which the vehicle is to be stopped because it is predicted to collide with the obstacle is set to be the same when the vehicle is moving forward as when it is moving backward, then the driver may experience a sense of discomfort, and this is not desirable. It should be understood that, in a situation in which the movement of the subject vehicle is difficult to predict or in a situation in which visual checking of the environment surrounding the subject vehicle is difficult, such as when the subject vehicle is turning or the like, a similar sense of discomfort may undesirably be imparted to the driver even in some situation other than when the vehicle is being parked by being moved backward. The present invention has been conceived in consideration of the circumstances described above, and its object is, when a collision with an obstacle is predicted during automatic parking control and the subject vehicle is stopped, not to impart any sense of discomfort to the driver.

Solution to Technical Problem

According to the first aspect of the present invention, an automatic parking control device performs steering control and speed control so that a subject vehicle moves along a target path toward a recognized parking space; when an obstacle that is approaching the subject vehicle has been detected, calculates a collision position at which the subject vehicle will collide with the obstacle; on the basis of a margin distance that is set according to the driving behavior of the subject vehicle and the collision position, calculates a stop position upon the target path that is set before the collision position by the margin distance; and performs speed control so that the subject vehicle stops at the stop position that has been calculated.

According to the second aspect of the present invention, a parking assistance device performs steering control so as to move a subject vehicle along a target path toward a recognized parking space; when an obstacle that is approaching the subject vehicle has been detected, calculates a collision position at which the subject vehicle will collide with the obstacle; and outputs an alarm upon arrival at an alarm position that is a position upon the target path before the collision position, and that is a margin distance before the collision position set according to the driving behavior of the subject vehicle.

Advantageous Effect of Invention

Since, according to the present invention, when collision with an obstacle is predicted during parking operation, it is arranged to stop the subject vehicle and/or to provide a collision alarm at a position before the obstacle by a margin distance that is set according to the operating state of the subject vehicle, accordingly no sense of discomfort is imparted to the driver.

BRIEF DESCRIPTION OF DRAWINGS

FIG. 3 is a figure for explanation of parking path generation;
FIGS. 5A and 5B are figures for explanation of calculation of a target speed;
FIG. 9 is a flow chart for explanation of the operation of the automatic parking control device according to the first embodiment of the present invention;
FIG. 12 is a flow chart for explanation of the operation of the parking assistance device according to the second embodiment of the present invention.

DESCRIPTION OF EMBODIMENTS

Embodiment #1

Figure 1:
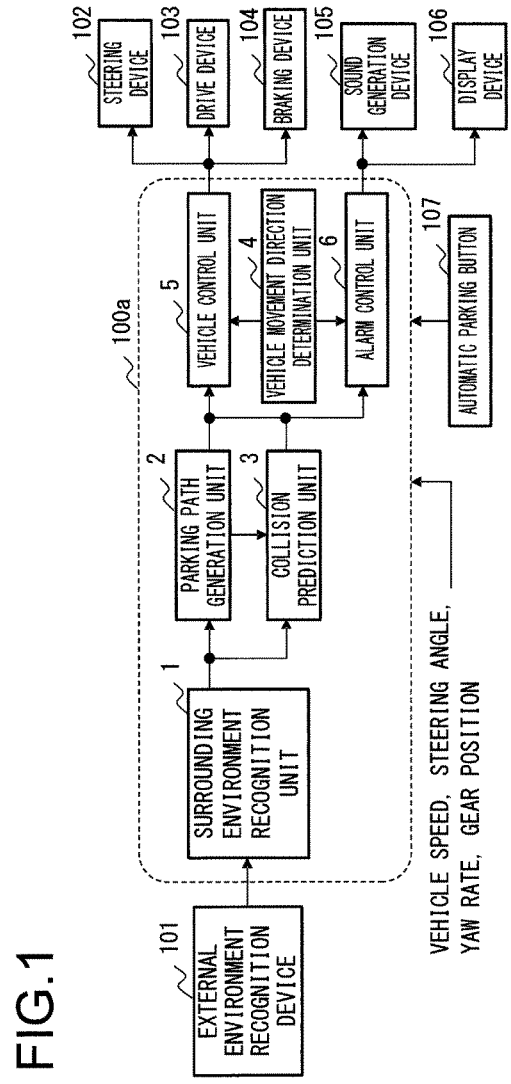
FIG. 1 is a figure showing the overall structure of an automatic parking control device according to a first embodiment of the present invention.

FIG. 1 is a figure showing the overall structure of an automatic parking control device according to a first embodiment of the present invention. The control device 100*a* that is shown by way of example in FIG. 1 includes a computer that controls the subject vehicle, and that, by executing a program stored upon a storage medium not shown in the figures, functions as a surrounding environment recognition unit 1, a parking path generation unit 2, a collision prediction unit 3, a vehicle movement direction determination unit 4, a vehicle control unit 5, and an alarm control unit 6.

The control device 100*a* is connected to a steering device 102, a drive device 103, and a braking device 104 of the vehicle, and is also connected to a external environment recognition device 101, a sound generation device 105, a display device 106, and an automatic parking button 107 that are provided to the vehicle. Moreover, the control device 100*a* is connected to a CAN (not shown in the figures) of the subject vehicle, and information relating to the vehicle, such as speed, steering angle, yaw rate, gear position, and so on, is inputted thereto.

The external environment recognition device 101 is a device that acquires information relating to the environment surrounding the subject vehicle, and may, for example, include four onboard cameras that respectively photograph the nearby environment at the front of the vehicle, the nearby environment at its rear, the nearby environment at its right side, and the nearby environment at its left side. Images captured by these onboard cameras are outputted to the control device 100*a* using dedicated lines or the like, either as original analog data or after having being A/D converted.

The steering device 102 includes an electrically operated power steering system or a hydraulic power steering system or the like, and, according to drive commands from outside, is capable of controlling the steering angle with an electrically operated or hydraulically operated actuator or the like.

The drive device 103 includes an engine system that is capable of controlling the engine torque with an electrically operated throttle or the like according to drive commands from outside, or includes an electrically operated power train system that is capable of controlling the drive force of an electric motor or the like according to drive commands from outside, or the like.

The braking device 104 includes an electrically operated brake or a hydraulic brake that is capable of controlling braking force with an electrically operated or hydraulically operated actuator or the like, according to drive commands from outside.

The sound generation device 105 includes a speaker or the like, and is used for outputting alarms and so on to the driver.

The display device 106 includes a display of a navigation device, a meter panel, a warning lamp or the like. Apart from an operating screen for the control device 100*a*, a warning screen is also displayed upon this display device 106 for visually conveying to the driver the fact that the subject vehicle is in danger of colliding with an obstacle, or the like.

And the automatic parking button 107 is an operating member that is provided in a position where it can be actuated by the driver, and, according to such actuation by the driver, outputs a start signal to the control device 100*a* for starting the operation of the control device 100*a*.

Using the image data inputted from the external environment recognition device 101 in which the surroundings of the subject vehicle are captured, the surrounding environment recognition unit 1 detects shapes and positions of objects, such as stationary three dimensional objects, objects that are moving, road surface markings like parking box lines, traffic signs, and so on around the subject vehicle. Such a stationary three dimensional object may, for example, be a parked vehicle, a wall, a post, a pylon, a curb, a vehicle stop, or the like. Moreover, such an object that is moving may be, for example, a pedestrian, a bicycle, a motorcycle, a vehicle, or the like. In the following, the term "obstacle" will be used as a generic term that refers both to a stationary three dimensional object and to a moving object. The information on the shapes and the positions of objects is detected by using a pattern matching technique or some other publicly known technique. The positions of objects may, for example, be expressed in terms of a coordinate system whose origin is the position of the onboard camera that photographs forward from the subject vehicle.

Furthermore, on the basis of information related to the shape and the position of an object that has been detected, the surrounding environment recognition unit 1 determines a space in which the vehicle can be parked as being a space in which parking is possible. For example, a space that is delimited by parallel parking box lines is determined as being a space in which parking is possible.

From the positional relationship of the subject vehicle and any obstacle or obstacles, the parking path generation unit 2 sets a target parking position in which the subject vehicle is to be parked within a space in which parking is possible, and generates a target path for parking in this target parking position from the current position of the vehicle.

The collision prediction unit 3 determines whether or not the subject vehicle will collide with an obstacle if it travels along the path generated by the parking path generation unit 2. And, on the basis of the results of recognition by the surrounding environment recognition unit 1, the collision prediction unit 3 hypothesizes a path of movement for an object that is moving, and makes a determination as to whether or not the subject vehicle will collide with the moving object at the point of intersection of this vehicle path and the predicted path of the moving object.

On the basis of the parking path that has been generated by the parking path generation unit 2, the vehicle movement direction determination unit 4 determines the direction of movement of the subject vehicle when it will collide with the obstacle. The result of determining whether the subject vehicle is moving forward or backward and the result of determining whether the vehicle is moving straight or is turning are included in this direction of movement of the subject vehicle that is determined by the vehicle movement direction determination unit 4. In other words, the vehicle movement direction determination unit 4 determines which one of the combinations (forward, straight), (backward, straight), (forward, turning), and (backward, turning) the direction of progression of the subject vehicle is.

The vehicle control unit 5 controls the subject vehicle along the parking path generated by the parking path generation unit 2. The vehicle control unit 5 calculates a target steering angle and a target speed on the basis of the parking path. And the vehicle control unit 5 outputs a target steering torque for implementing this target steering angle to the steering device 102. Moreover, the vehicle control unit 5 outputs a target engine torque and/or a target brake pressure for implementing the target speed to the drive device 103 and/or to the braking device 104. Yet further, if a collision between the subject vehicle and an obstacle has been predicted by the collision prediction unit 3, then the vehicle control unit 5 calculates a target steering angle and a target speed in order for no collision between the vehicle and the obstacle to take place, and outputs control parameters based upon this target steering angle and upon this target speed to the steering device 102, to the drive device 103, and to the braking device 104.

And, if a collision between the subject vehicle and an obstacle is predicted by the collision prediction unit 3, then, at a timing that will be described hereinafter, the alarm control unit 6 outputs an alarm generation command for attracting the attention of the driver to the sound generation device 105 or to the display device 106 or the like. And the sound generation device 105 outputs a predetermined audio alarm on the basis of this alarm generation command. Or, the display device 106 displays a predetermined warning screen image on the basis of this alarm generation command.

In the following, the operation of the control device 100*a* when parking the subject vehicle backwards into a parking box of a parking area will be explained. When the driver of the subject vehicle that has entered into a parking area operates the automatic parking button 107, the operation of the surrounding environment recognition unit 1 starts, and detection of a space into which parking is possible starts.

For each frame, image data in which the surroundings of the subject vehicle are photographed is inputted from the external environment recognition device 101 to the surrounding environment recognition unit 1. And, by a publicly known technique, the surrounding environment recognition unit 1 creates a bird's eye view image related to the environment surrounding the subject vehicle by using the image data inputted from the external environment recognition device 101, for example the image data from four onboard cameras each of which photographs the surrounding environment in one of four directions from the subject vehicle. And the surrounding environment recognition unit 1 detects a space in which parking is possible from this bird's eye view image.

Figure 2A:
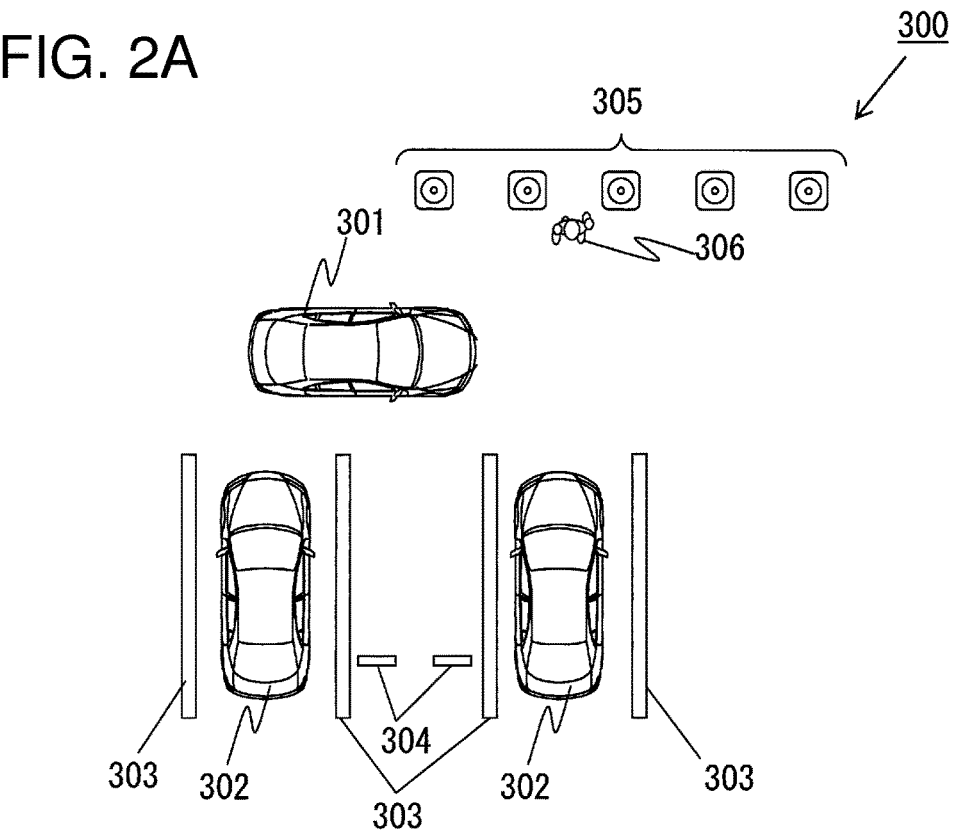
FIGS. 2A and 2B are figures for explanation of surrounding environment recognition.
Figure 2B:
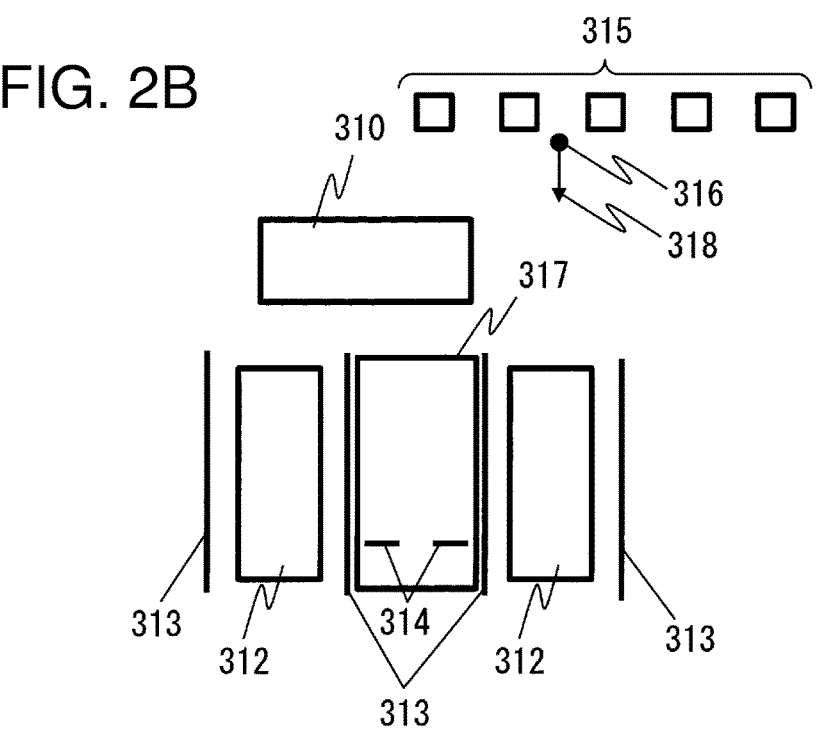

FIG. 2(*a*) shows an example of a bird's eye view image generated by the surrounding environment recognition unit 1 in relation to the environment surrounding the subject vehicle. In this bird's eye view image 300 shown by way of example in FIG. 2(*a*), a total of three parking spaces for parallel parking in which vehicle stops 304 are provided are present on the right side of the subject vehicle 301, these spaces being delimited by parking box lines 303. Among these three parking spaces, parked vehicles 302 are already present in the one on the left side and in the one on the right side. No parked vehicle is present in the central one of these parking spaces, so that it is possible to park the subject vehicle 301 there. Five pylons 305 are present on the left side of the subject vehicle 301, and a pedestrian 306 is present drawing near to the subject vehicle 301 on the front left side of the subject vehicle 301.

By using a publicly known pattern matching technique upon the bird's eye view image 300, the surrounding environment recognition unit 1 detects the parked vehicles 302, the parking box lines 303, the vehicle stops 304, the pylons 305, and the pedestrian 306, and acquires information relating to their positions. For example, the surrounding environment recognition unit 1 may recognize the parked vehicles 302 and the pylons 305 as respective rectangles 312 and rectangles 315, and may acquire the coordinates of the corners of these rectangles. Moreover, the surrounding environment recognition unit 1 may recognize the parking box lines 303 and the vehicle stops 304 as respective line segments 313 and 314, and may acquire the coordinates of the two ends of each of these line segments. Yet further, the surrounding environment recognition unit 1 may recognize the pedestrian 306 as a point 316, and may acquire the coordinates of that point.

Furthermore, the surrounding environment recognition unit 1 detects the direction of movement of the pedestrian 306 from a plurality of bird's eye view image frames, and thereby acquires a vector 318 that specifies this direction of movement. Information relating to the shape of the subject vehicle 301 is set in advance in the surrounding environment recognition unit 1. For example, the coordinates of the corners of a rectangle 310 that specifies the subject vehicle 301 may be set in advance in the surrounding environment recognition unit 1. It should be understood that, in the following explanation, the rectangle 310 that specifies the subject vehicle 301 will sometimes be abbreviated as the "subject vehicle 310", and the rectangles 312 that specify the parked vehicles 302 will sometimes be abbreviated as the "parked vehicles 312".

On the basis of the bird's eye view image, for example, the surrounding environment recognition unit 1 may detect a region that is delimited by the parking box lines 303 and in which vehicle stops 304 are detected, and that moreover is larger than the subject vehicle 301, as being a space 317 in which parking is possible. A parking space in which a parked vehicle 312 is present is not detected as being a space in which parking is possible, since its vehicle stops 314 are hidden by the parked vehicle 312. In FIG. 2(*b*), the space 317 in which parking is possible is detected as being a rectangular region. The surrounding environment recognition unit 1 calculates positional information for the corners of this region.

When the control device 100*a* has detected the space 317 in which parking is possible, it notifies the driver that it is possible for him to change over to automatic parking control. For example, the control device 100*a* may output the message "Automatic parking is possible. Please stop" from the sound generation device 105 and/or from the display device 106. And, when the driver stops the subject vehicle 301 upon receipt of this notification, the control device 100*a* starts the processing by the parking path generation unit 2. The parking path generation unit 2 sets a target parking position within the space 317 that has been detected by the surrounding environment recognition unit 1 in which parking is possible, and calculates a target path to this target parking position from the position in which the subject vehicle 301 has been stopped. Hereinafter, this position in which the vehicle 301 was stopped when parking operation starts will be termed the "guiding start position".

FIG. 3 is a figure showing a target parking position 411 that has been set by the parking path generation unit 2 when the subject vehicle 301 has stopped at the position shown in FIG. 2(*a*), and the target path to that target parking position 411. The parking path generation unit 2 sets the target parking position 411 in the interior of the space 317 in which parking is possible shown in FIG. 2(*b*).

Moreover, the parking path generation unit 2 sets a changeback position 410 for driving the subject vehicle 310 backwards into the target parking position 411 for parking. And, as the target path, the parking path generation unit 2 sets a forward path 400 for the vehicle 310 to be moved forward from the guiding start position of the vehicle 310 to the changeback position 410, and a backward path 401 for the vehicle to be moved backward from the changeback position 410 to the target parking position 411.

The forward path 400 shown in FIG. 3 includes a turning section for moving the subject vehicle 310 over to its left, and a rectilinear section that proceeds in a straight line from the guiding start position to a turning start position 421 where this turning starts. The parking path generation unit 2 expresses the path in the rectilinear section by a straight line, and approximates the path in the turning section by a combination of a clothoid curve and a circular arc. A clothoid curve is a path that the subject vehicle 310 traces out when the steering angle of the subject vehicle 310 is changed at a fixed angular velocity, with the speed of the subject vehicle 310 being kept constant. And a circular arc is a path that the subject vehicle 310 traces out when the steering angle of the subject vehicle 310 is kept fixed at a predetermined value (excluding the case of the steering angle when the subject vehicle is proceeding straight ahead), with the speed of the subject vehicle 310 being kept constant.

The backward path 401 shown in FIG. 3 is expressed as a curve that is a combination of a clothoid curve and a circular arc from the changeback position 410 to the target parking position 411. The end point of this backward path 401 is set to the position where the rear wheels of the subject vehicle 310 come into contact with the vehicle stops 314.

When the control device 100a has calculated the forward path 400 and the backward path 401, after a predetermined time period, it outputs the message "Please press the automatic parking start button" via the sound generation device 105 and/or the display device 106. And, when the driver actuates the automatic parking button 107, the control device 100a starts the processing of the collision prediction unit 3. The collision prediction unit 3 makes a decision as to whether or not collision with any obstacle will occur if the subject vehicle moves along the forward path 400 and the backward path 401. On the basis of the movement direction of any moving object detected by the surrounding environment recognition unit 1, for example on the basis of the movement direction of the pedestrian 306, the collision prediction unit 3 calculates a supposed path along which it is supposed that the pedestrian 306 will pass.

Figure 4:
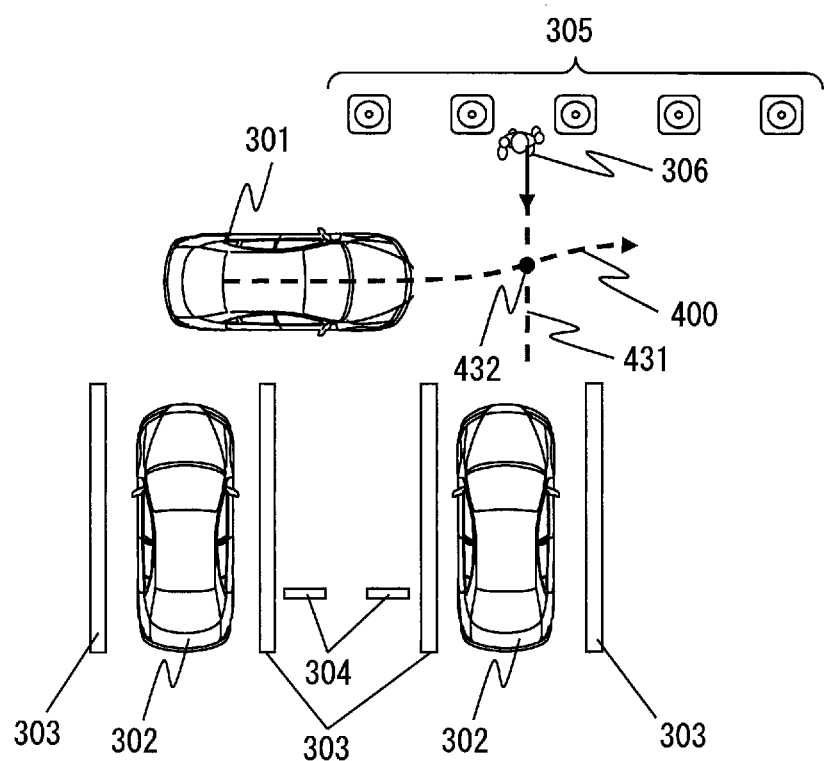
FIG. 4 is a figure for explanation of collision prediction.

FIG. 4 shows an example of a supposed path 431 of the pedestrian 306 generated by the collision prediction unit 3. This supposed path 431 is the path that is supposed when it has been hypothesized that the pedestrian 306 will proceed forward in the direction specified by the vector 318 without deviating.

The collision prediction unit 3 calculates the point of intersection 432 of the forward path 400 and the supposed path 431 as being the position where there is a danger of the subject vehicle 301 colliding with the obstacle. And the collision prediction unit 3 calculates the time periods until each of the subject vehicle 301 and the pedestrian 306 will arrive at the point of intersection 432 of the target path of the subject vehicle and the supposed path of the pedestrian, and makes a decision as to whether or not the subject vehicle 301 and the pedestrian 306 will collide from their mutual positional relationship when both of them respectively arrive at the point of intersection 432. And in a similar manner, for the backward path 401 as well, the collision prediction unit 3 calculates its point of intersection with the supposed path 431, and calculates the time periods until each of the subject vehicle 301 and the pedestrian 306 will arrive at this point of intersection, and thereby makes a decision as to whether or not the subject vehicle 301 and the pedestrian 306 will collide. The collision prediction unit 3 outputs the position of the point of intersection at which it has determined that the subject vehicle 301 will collide with the obstacle to the vehicle control unit 5 as the predicted collision position.

And, if it has been determined by the collision prediction unit 3 that the subject vehicle 301 will not collide with any obstruction, in other words if no predicted collision position is outputted, then the vehicle control unit 5 guides the subject vehicle 301 along the forward path 400 and the backward path 401 that have been generated by the parking path generation unit 2. The vehicle control unit 5 determines a target speed and a target steering angle so that the subject vehicle 301 should move along the forward path 400 and the backward path 401, and outputs this target steering angle to the steering device 102 while outputting the target speed to the drive device 103 and to the braking device 104.

FIG. 5(a) is a figure showing an example of the target speed control by the vehicle control unit 5 that is implemented if the collision prediction unit 3 has decided that, upon the forward path, the subject vehicle 301 will not collide with any obstacle. The position of the vehicle along the forward path 400 is shown upon the horizontal axis in FIG. 5(a), and the target speed at that position is shown upon the vertical axis. The left end of the horizontal axis is the guiding start position. The vehicle control unit 5 gradually reduces the target speed from a deceleration start position before the changeback position 410, and stops the subject vehicle 301 at the changeback position 410.

But if the collision prediction unit 3 has decided that the subject vehicle 301 will collide with an obstacle upon the forward path, then the vehicle control unit 5 avoids this collision with the obstacle by stopping the subject vehicle 301 at just a margin distance DIST from the collision position upon the forward path 400.

And FIG. 5(b) is a figure showing an example of the target speed control by the vehicle control unit 5 that is implemented if the collision prediction unit 3 has decided that the subject vehicle 301 will collide with an obstacle. The position of the vehicle along the forward path 400 is shown upon the horizontal axis in FIG. 5(b), and the target speed at that position is shown upon the vertical axis. The left end of the horizontal axis in FIG. 5(b) is the guiding start position. In FIG. 5(b), the target speed of the subject vehicle 301 is reduced so that the subject vehicle 301 stops at a target stop position that is just the margin distance DIST before its predicted position of collision with the obstacle.

Figure 6A:
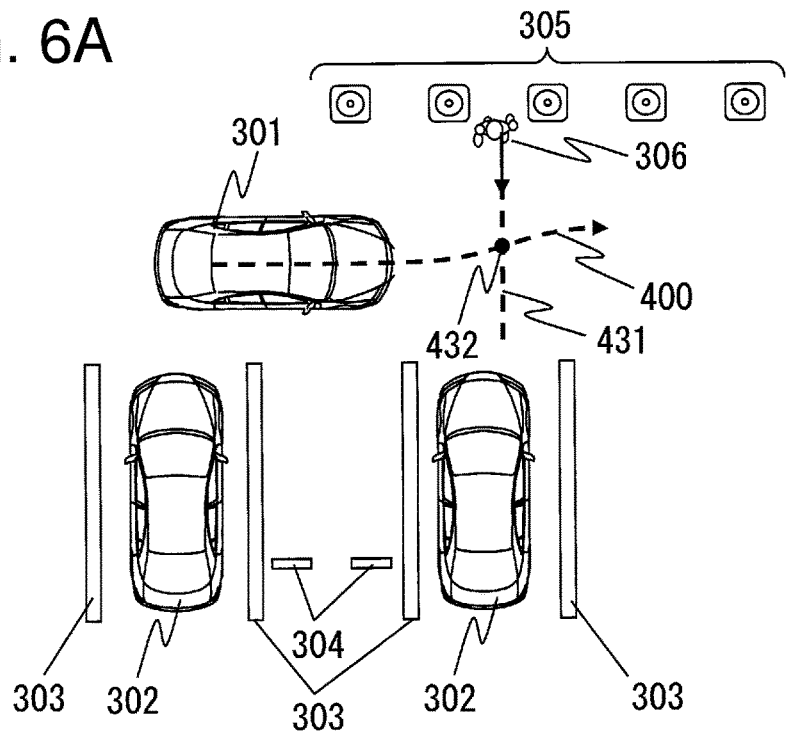
FIGS. 6A and 6B are figures for explanation of control when the vehicle is moving forward.
Figure 6B:
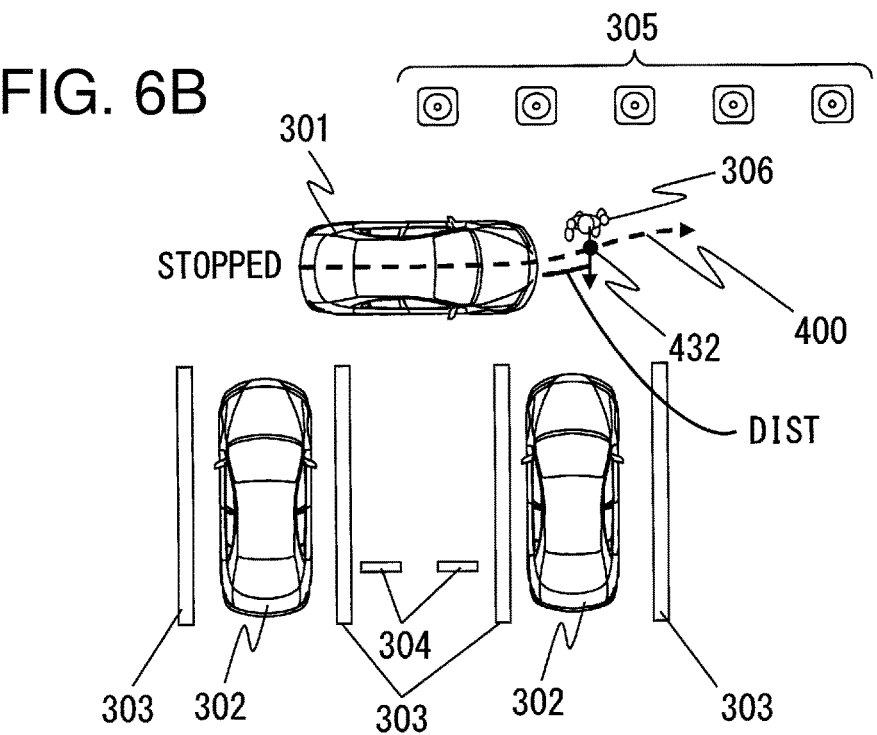

For example, when as shown in FIG. 6(a) the subject vehicle 301 is progressing straight forward along the forward path 400, in other words when the movement direction of the vehicle is (forward, straight), if it is predicted that a collision will occur at the point of intersection 432, then, as shown in FIG. 6(b), the target speed of the subject vehicle 301 is reduced so that it stops at a position upon the forward path 400 that is just the margin distance DIST before the point of intersection 432.

The margin distance DIST is changed on the basis of the direction of progression of the subject vehicle 301 at the predicted collision position, and is set to be greater, the more cautious is the manner in which the driver is driving. In other words, the more cautious is the manner in which the driver is driving, the further before the predicted collision position is the position at which the vehicle is stopped.

Figure 7A:
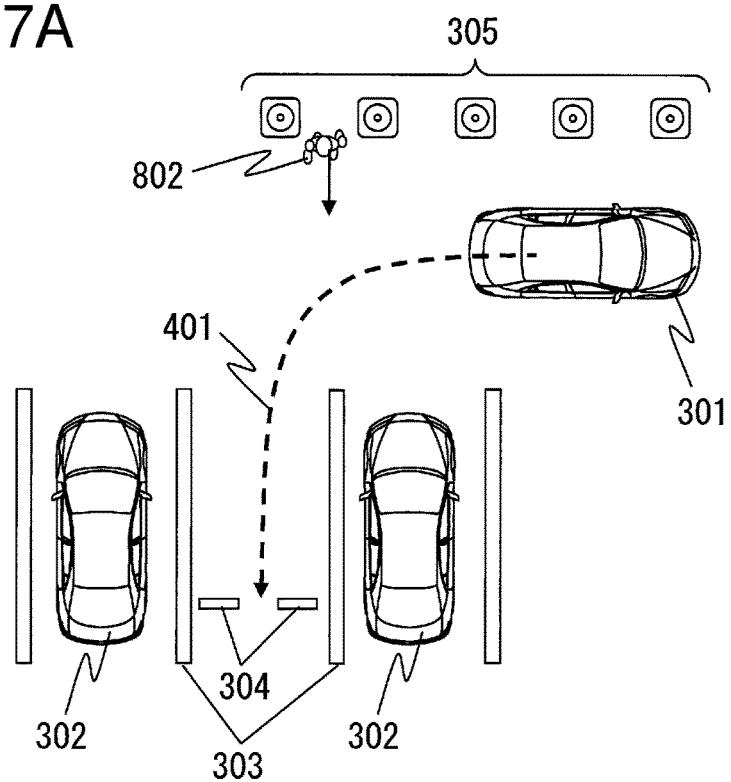
FIGS. 7A and 7B are figures for explanation of control when the vehicle is moving backward.
Figure 7B:
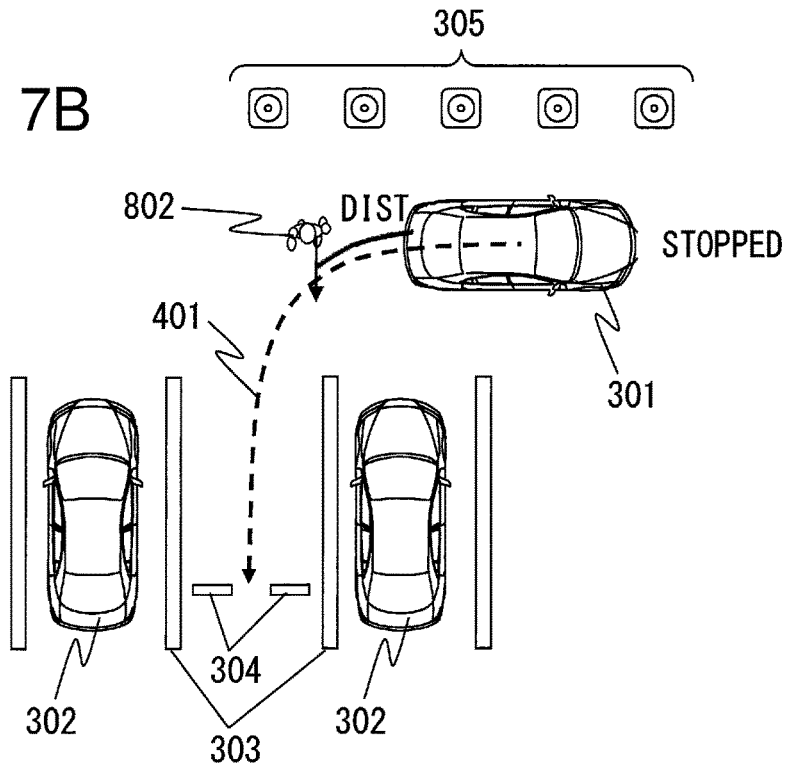

For example, when as shown in FIG. 7(a) the subject vehicle 301 is moving backward, the driver has a tendency to drive the vehicle in a cautious manner, since he fears that a pedestrian 802 who is walking somewhere behind the subject vehicle 301 may be present in his blind spot. Thus if, as shown in FIG. 7(b), the subject vehicle 301 would be moving backward at the predicted collision position, then it is possible to stop the vehicle without imparting any sense of discomfort to the driver by setting the margin distance DIST to a larger value than if the vehicle were moving forward, thus making the distance between the subject vehicle 301 and the obstacle greater. Moreover the safety of the pedestrian 802 is also enhanced, since the subject vehicle 301 is stopped at a position that is well separated from the pedestrian 802.

Figure 8A:
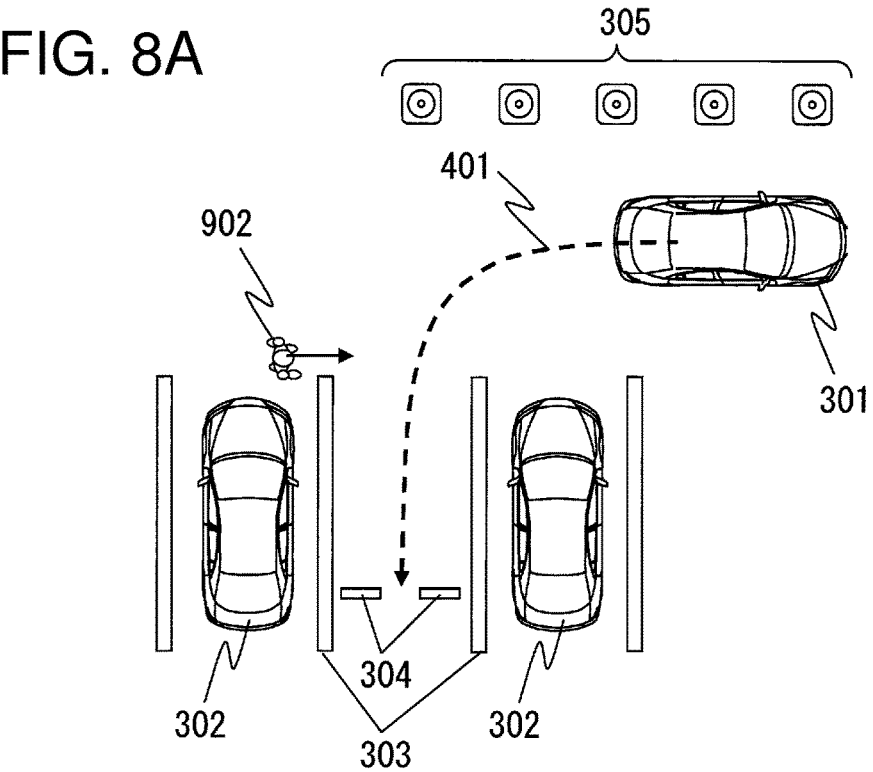
FIGS. 8A and 8B are figures for explanation of control when the vehicle is turning.
Figure 8B:
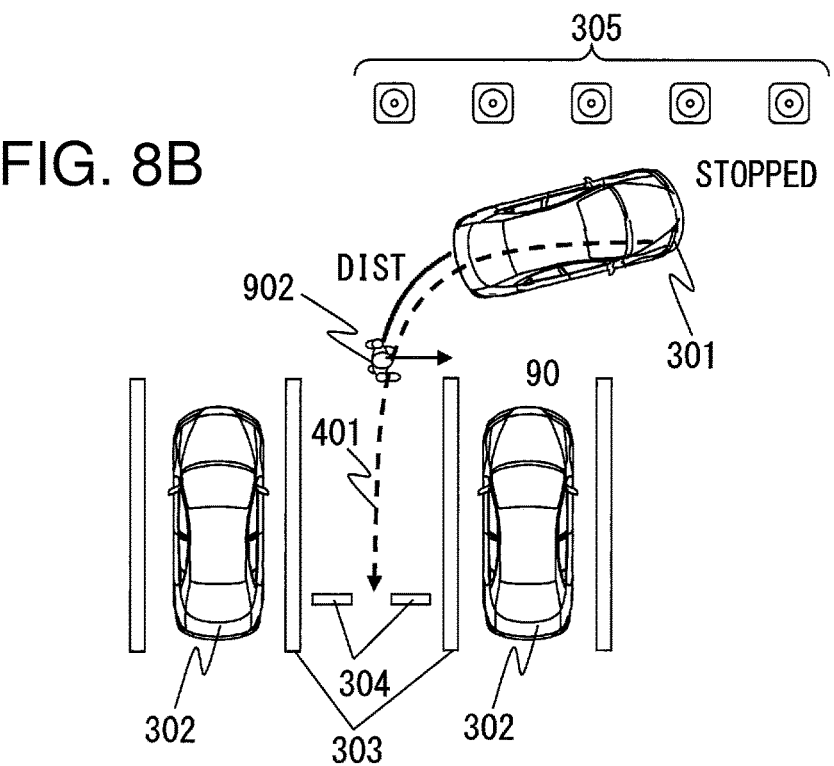

Furthermore, for example, as shown in FIG. 8(a), when the subject vehicle 301 is turning, the driver has a tendency to drive the subject vehicle 301 in a cautious manner, since it is difficult for him to predict the movement of the vehicle. Thus if, as shown in FIG. 8(*b*), the subject vehicle 301 would be turning at the predicted collision position, then it is possible to stop the vehicle without imparting any sense of discomfort to the driver by setting the margin distance DIST to a larger value than if the vehicle were proceeding in a straight line, thus making the distance between the subject vehicle 301 and the obstacle greater. Moreover the safety of the pedestrian 902 is also enhanced, since the subject vehicle 301 is stopped at a position that is well separated from the pedestrian 902.

The margin distance DIST may, for example, be calculated by using the following Equation (1). STDDIST is a predetermined value, for example 3 m. BACKGAIN is a gain for adjusting the margin distance to a larger value if the subject vehicle is moving backward. And TURNGAIN is a gain for adjusting the margin distance to a larger value if the subject vehicle is turning.

$$DIST=STDDIST \times BACKGAIN \times TURNGAIN \qquad (1)$$

For example, BACKGAIN may be set to 1 if the subject vehicle would be moving forward at the predicted collision position, and may be set to 1.2 if the vehicle would be moving backward at the predicted collision position. And, for example, TURNGAIN may be set to 1 if the subject vehicle would be proceeding in a straight line at the predicted collision position, and may be set to 1.2 if the vehicle would be turning at the predicted collision position.

The margin distance DIST has its smallest value, for example 3 m, if the progression direction of the subject vehicle at the predicted collision position would be (forward, straight). And, if the progression direction of the subject vehicle at the predicted collision position would be (forward, turning) or (backward, straight), then, rounded up to the nearest integer, the margin distance DIST is set to 4 m. Moreover, if the progression direction of the subject vehicle at the predicted collision position would be (backward, turning), then, rounded up to the nearest integer, the margin distance DIST is set to 5 m.

If, after the subject vehicle 301 has been stopped at the target stop position, the collision prediction unit 3 determines that there is no danger of collision with the obstacle, then the vehicle control unit 5 controls the subject vehicle so that it moves along the target path generated by the parking path generation unit 2.

Figure 10:
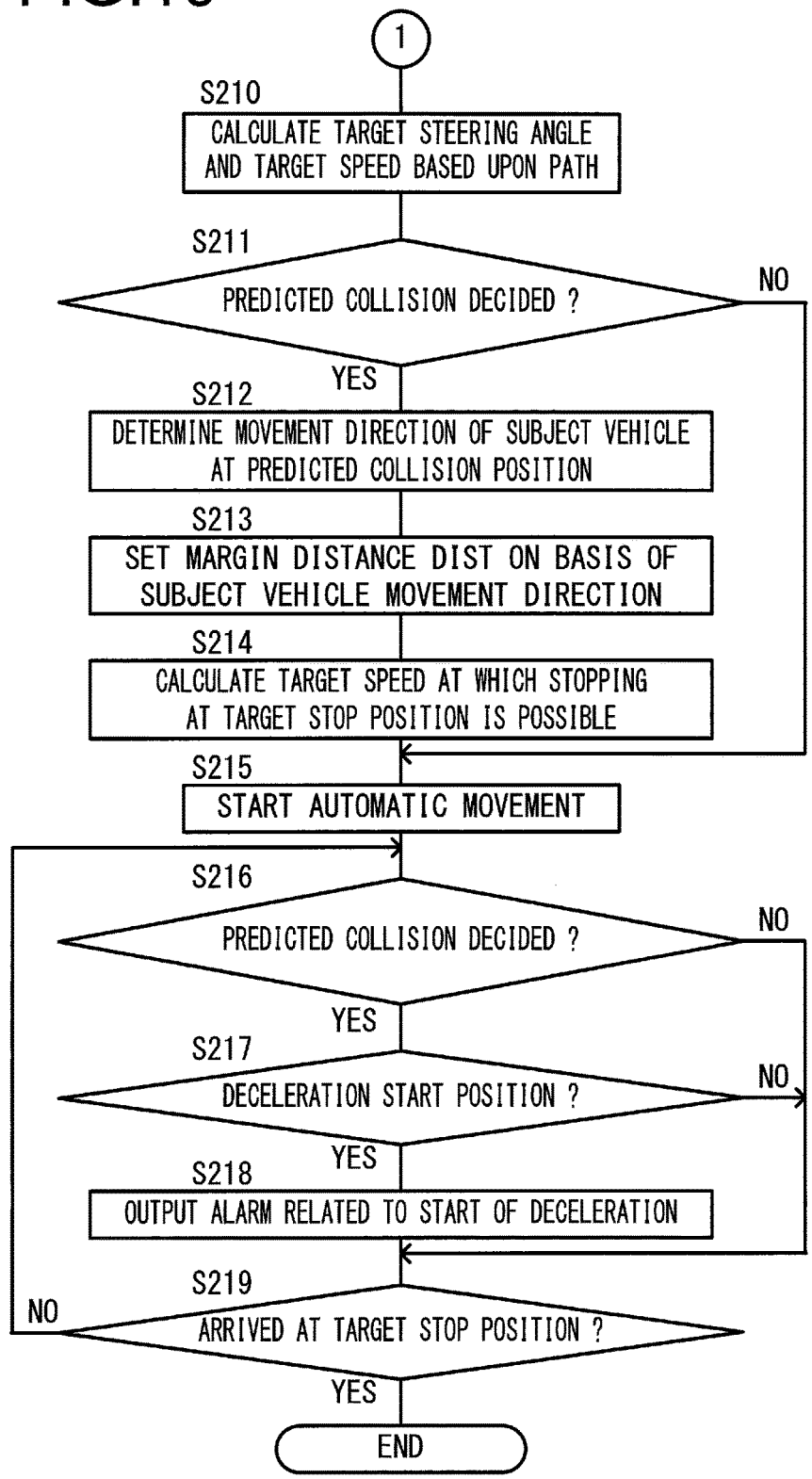
FIG. 10 is a flow chart for explanation of vehicle control signal generation processing.

FIGS. 9 and 10 are flow charts showing an example of a processing sequence performed by the control device 100*a*.

In step S200, the control device 100*a* makes a decision as to whether or not the automatic parking button 107 has been actuated. The control device 100*a* repeats the processing of step S200 until the automatic parking button 107 is actuated, and, when the automatic parking button 107 has been actuated the flow of control proceeds to step S201.

In step 201 of FIG. 9, the control device 100*a* starts capturing image data from the external environment recognition device 101. And subsequently the control device captures image data from the external environment recognition device 101 for each frame.

Then in step 202 the control device 100*a* inputs the image data captured in step S201 into the surrounding environment recognition unit 1, and attempts to detect a space in which parking is possible. Subsequently, each time image data is captured from the external environment recognition device 101, it is inputted into the surrounding environment recognition unit 1, and the shapes and positions of objects around the subject vehicle such as stationary three dimensional objects, objects that are moving, road surface paintings or markings or the like such as parking box lines, traffic signs and so on are detected.

In step S203, the control device 100*a* makes a decision as to whether or not a space in which parking is possible has been detected in step S202. If the control device 100*a* has detected a space in which parking is possible, then the flow of control continues to step S204, whereas if no parking space has been detected then the flow of control returns to step S202.

In step S204, the control device 100*a* outputs a message that invites the subject vehicle to stop, for example "Automatic parking is possible. Please stop", from the sound generation device 105 and/or from the display device 106.

In step S205, the control device 100*a* makes a decision as to whether or not the subject vehicle has stopped. In more detail, the control device 100*a* makes a decision as to whether or not the vehicle has stopped at a guiding start position. If the subject vehicle has stopped, then the control device 100*a* transfers the flow of control to step S206, whereas if the subject vehicle has not stopped then the flow of control is transferred to step S202.

In step S206, the control device 100*a* inputs the space in which parking is possible that has been detected in step S202 to the parking path generation unit 2, and also recognizes the position at which the subject vehicle has stopped as being the guiding start position. And the target parking position is set to the space in which parking is possible, and a target path from the position at which the subject vehicle is stopped, in other words from the guiding start position, to arrive at the target parking position is generated; in other words, the forward path and the backward path described above are generated.

In step S207, the control device 100*a* outputs a message that invites the driver to actuate the automatic parking start button, for example "Please press the automatic parking start button", from the sound generation device 105 and/or from the display device 106.

In step S208, the control device 100*a* makes a decision as to whether or not the automatic parking button 107 has been actuated. The control device 100*a* repeats the processing of this step S208 until the automatic parking button 107 is actuated, and when the automatic parking button 107 is actuated the flow of control proceeds to step S209.

It should be understood that, when the automatic parking button 107 has been actuated, it is desirable to provide a guidance message via audio such as "Starting automatic movement. If you operate the steering wheel, the brake, or the accelerator after movement has started, automatic parking assistance processing will be terminated."

In step S209, the control device 100*a* makes a decision as to whether or not, if the subject vehicle moves along the forward path and then the backward path generated in step S206, the subject vehicle will collide with any obstacle. After this decision as to whether or not the subject vehicle will collide with any obstacle, the control device 100*a* transfers the flow of control to the processing of step S210 of FIG. 10.

In this step 210 of FIG. 10, the control device 100*a* calculates a target steering angle and a target speed on the basis of the target path generated in step S205, in other words on the basis of the forward path and the backward path. As previously described, the forward path and the backward path consist of combinations of straight lines, clothoid curves, and circular arcs. For a path section along a straight line, the control device 100*a* sets a target steering angle and a target speed so that the subject vehicle travels at the target speed in a straight line direction. For a path section along a clothoid curve, the control device 100a changes the target steering angle at a predetermined angular velocity and also sets the target speed to a predetermined speed, so that the path along which the subject vehicle moves becomes that clothoid curve. And, for a path section along a circular arc, the control device 100a sets the target steering angle to a predetermined target steering angle and also sets the target speed to a predetermined speed, so that the path along which the subject vehicle moves becomes that circular arc.

For example, the control device 100a may calculate speeds and steering angles at predetermined time intervals and store them as automatic driving control data, so that the subject vehicle moves along the target path from the parking start position to the parking end position. And, after automatic driving has started, the control device 100a may drive the vehicle automatically with feed forward control, using this automatic driving control data. It should be understood that, after having started movement from the parking start position, it is desirable to recalculate the position of the subject vehicle and to correct errors from the target path.

In step S211, the control device 100a makes a decision as to whether or not a collision with an obstacle was predicted in step S209 of FIG. 9. If it is predicted in step S209 that a collision with an obstacle will take place, then the control device 100a transfers the flow of control to step S212, whereas, if it is predicted in step S209 that no collision with an obstacle will take place, then the flow of control is transferred to step S215.

In step S212, the control device 100a determines the direction of movement of the subject vehicle at the predicted collision position. If the predicted collision position is positioned upon the forward path, then the control device 100a determines that the direction of movement of the subject vehicle at the predicted collision position is forward, whereas, if the predicted collision position is positioned upon the backward path, then the control device 100a determines that the direction of movement of the subject vehicle at the predicted collision position is backward. Moreover, if the predicted collision position is upon a path that is specified by a straight line, then the control device 100a determines that the direction of movement of the subject vehicle at the predicted collision position is rectilinear, while if the predicted collision position is upon a path that is specified by a clothoid curve or by a circular arc, then it is determined that the direction of movement of the subject vehicle at the predicted collision position is turning.

In step S213, the control device 100a calculates the margin distance DIST on the basis of the direction of movement of the subject vehicle that has been determined in step S212. The control device 100a then sets the target stop position at a position that is just the margin distance DIST before the predicted collision position.

In step S214, the control device 100a calculates the target speed between the deceleration start position shown in FIG. 5(*b*) and the target stop position. For example, the control device 100a may calculate the target speed between the deceleration start position and the target stop position so that the vehicle decelerates at constant deceleration rate between the deceleration start position and the target stop position and so that the target speed reaches zero at the target stop position.

In step S215, the control device 100a starts movement of the subject vehicle on the basis of the target steering angle and the target speed. In other words, along with sending steering commands corresponding to the target steering angle to the steering device 102, the control device 100a also sends braking and/or driving commands corresponding to the target speed to the drive device 103 and to the braking device 104.

In step S216, the control device 100a makes a decision as to whether or not a collision with an obstacle was predicted in step S209 of FIG. 9. If it has been predicted in step S209 that a collision with an obstacle will take place, then the control device 100a transfers the flow of control to step S217, whereas, if it has been predicted in step S209 that no collision with an obstacle will take place, then the flow of control is transferred to step S219.

In step S217, the control device 100a makes a decision as to whether or not the position of the subject vehicle is the deceleration start position. If the position of the subject vehicle is the deceleration start position, then the control device 100a transfers the flow of control to step S218, whereas, if the position of the subject vehicle is not the deceleration start position, then the flow of control is transferred to step S219.

In step S218, if it was determined in step S209 that a collision with an obstacle will take place, then, the control device 100a causes the alarm control unit 6 to generate an alarm generation command for attracting the attention of the driver to the fact that the vehicle is decelerating in order to avoid this collision. The alarm control unit 6 outputs this alarm generation command to the sound generation device 105 and/or to the display device 106.

In step S219, the control device 100a makes a decision as to whether or not the subject vehicle has arrived at the target stop position. If the subject vehicle has not arrived at the target stop position, then the control device 100a transfers the flow of control to step S216. But if the subject vehicle has arrived at the target stop position, in other words if the subject vehicle is stopped at the target stop position, then the control device 100a terminates this processing.

According to the first embodiment as explained above, the following beneficial operational effects are obtained.

(1) This automatic parking control device is a device that: performs steering control and speed control so that the subject vehicle moves along a target path toward a recognized parking space; when an obstacle that is approaching the subject vehicle has been detected, calculates a collision position at which the subject vehicle will collide with the obstacle; on the basis of a margin distance that is set according to the driving behavior of the subject vehicle and the collision position, calculates a stop position upon the target path that is set in front of the collision position by the margin distance; and performs speed control so that the subject vehicle stops at the stop position that has been calculated. Accordingly no sense of discomfort is imparted to the driver, when a collision with an obstacle is predicted during automatic parking control and the subject vehicle is stopped.

(2) With this control device 100a, the collision position is a position at which the predicted progression path of the obstacle and the target path intersect, and furthermore is a position at which the subject vehicle and the obstacle arrive approximately simultaneously. Accordingly, there is no need to detect an obstacle that is approaching the subject vehicle during driving for automatic parking, since it is possible to detect an obstacle with which there is a possibility of collision in advance, before driving for parking starts.

(3) Since it is arranged to detect the parking space and the obstacle on the basis of images of the surroundings of the subject vehicle that is acquired by cameras, accordingly it is possible to build this device cheaply, as compared with an obstacle detection device that operates by radar or the like.

(4) The target path includes the forward path along which the subject vehicle is moved forward from its current position to the changeback position, and the backward path along which the subject vehicle is moved backward from the changeback position to the parking space, and the driving behavior is either moving forward or moving backward. And the margin distance upon the backward path is set to be greater than the margin distance upon the forward path. Accordingly it is possible to stop the vehicle at a stop position before stopping at the obstacle without imparting any sense of discomfort to the driver, just as when the driver himself is performing driving for parking.

(5) The target path includes the forward path along which the subject vehicle is moved forward from its current position to a changeback position, and the backward path along which the subject vehicle performs both motion in a straight line and turning while being moved backward from the changeback position to the parking space, and the driving behavior is either moving in a straight line or turning. And the margin distance upon the turning path is set to be greater than the margin distance upon the straight line path. Accordingly it is possible to stop the vehicle at a stop position before stopping at the obstacle without imparting any sense of discomfort to the driver, just as when the driver himself is performing driving for parking.

Embodiment #2

Figure 11:
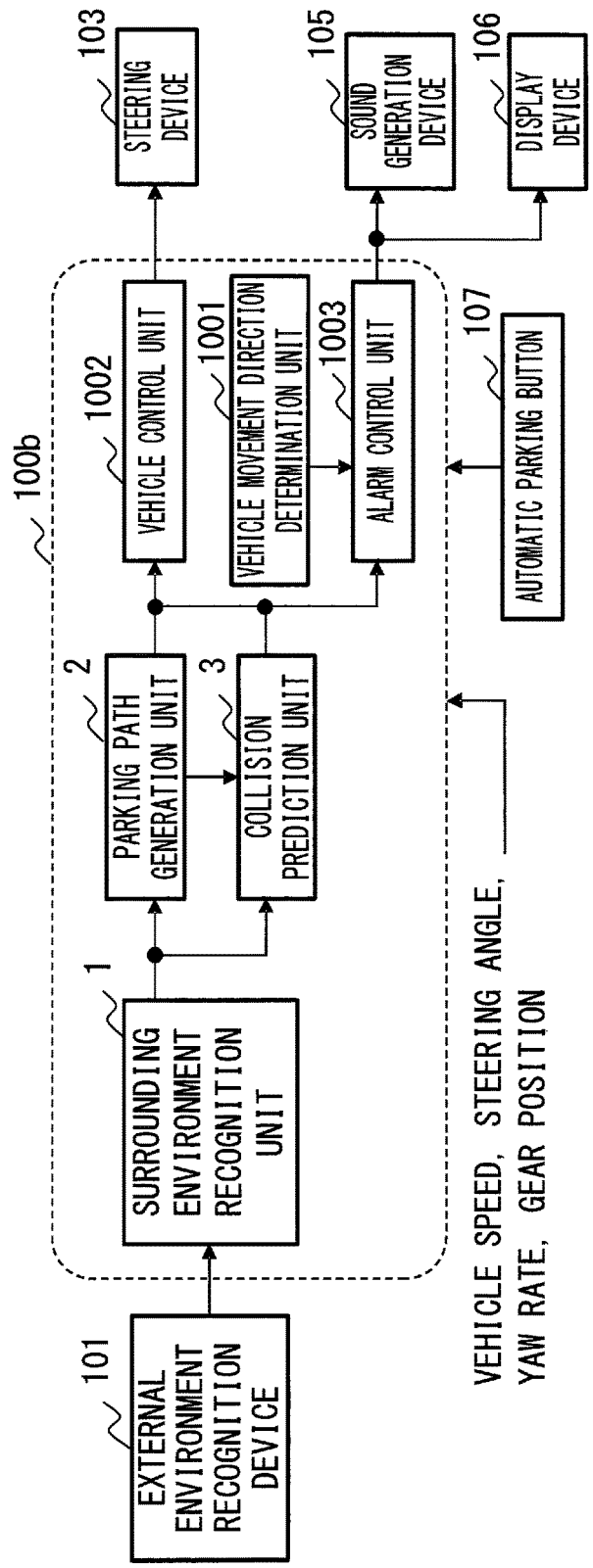
FIG. 11 is a figure showing the overall structure of a parking assistance device according to a second embodiment of the present invention.

FIG. 11 is a figure showing the overall structure of a parking assistance device according to a second embodiment of the present invention. The control device 100b shown in FIG. 11 is not connected to the drive device 103 or to the braking device 104, and does not control the speed of the subject vehicle, but only controls its steering angle. In other words, in this second embodiment, the speed of the subject vehicle 301 is controlled by the driver actuating the accelerator and the brake. Moreover, instead of the vehicle movement direction determination unit 4, the vehicle control unit 5, and the alarm control unit 6, this control device 100b comprises a vehicle movement direction determination unit 1001, a vehicle control unit 1002, and an alarm control unit 1003. It should be understood that, to portions in the structure of FIG. 11 that have the same functions as portions of the structure shown in FIG. 1, the same reference symbols are appended, and explanation thereof will be omitted.

In a similar manner to the case of the vehicle movement direction determination unit 4 of the first embodiment, this vehicle movement direction determination unit 1001 determines the direction of movement of the subject vehicle when a collision with an obstacle will occur (i.e., whether its movement is forward or backward, and whether it is straight line motion or turning), and outputs the result of this determination to the alarm control unit 1003. However, the vehicle control unit 1002 does not calculate any margin distance, since the control device 100b according to this second embodiment does not perform speed control for the subject vehicle. Due to this, the fact that the vehicle movement direction determination unit 1001 does not transmit the result of the above determination to the vehicle control unit 1002 is different from the case of the vehicle movement direction determination unit 4 of the first embodiment.

The vehicle control unit 1002 calculates a target steering angle along the path that has been generated by the parking path generation unit 2, and outputs a target steering torque to the steering device 102 for implementing this target steering angle.

In a similar manner to the case with the vehicle control unit 5 of the first embodiment, the alarm control unit 1003 calculates a margin distance DIST on the basis of the direction of movement of the subject vehicle by using Equation (1). The alarm control unit 1003 sets an alarm position that is just the margin distance DIST in front of the predicted collision position calculated by the collision prediction unit 3. And, if it is predicted by the collision prediction unit 3 that a collision between the subject vehicle and an obstacle will take place, then the alarm control unit 1003 outputs an alarm generation command to the sound generation device 105 and/or to the display device 106 when the subject vehicle arrives at the alarm position.

Until step S209 of FIG. 9, the processing performed by this control device 100b is the same as the processing performed by the control device 100a of the first embodiment.

However in the first embodiment it was desirable, when the automatic parking button 107 was actuated, to provide via audio, in step S208 of FIG. 9, a guidance message like "Starting automatic movement. If you operate the steering wheel, the brake, or the accelerator after movement has started, automatic parking assistance processing will be terminated." However, in this second embodiment, since only automatic operation of the steering is performed, accordingly the message "Automatic steering will be started when you step upon the accelerator pedal" is provided via audio. In this message, it is further desirable to provide the message "If you operate the steering wheel after movement has started, automatic parking assistance processing will be terminated."

FIG. 12 is a flow chart for explanation of an example of the processing that the control device 100b performs after executing the processing of step S209 of FIG. 9. To steps among those shown in FIG. 12, in other words to processing steps of this figure, that are similar to the respective processing steps shown in FIG. 10, the same reference symbols are appended, and explanation thereof will be omitted.

In step S1215, if the accelerator pedal is stepped upon, the control device 100b starts semi-automatic parking, in other words starts parking assistance operation, and lets the subject vehicle move. In other words, as the driver actuates the accelerator and the brake and the vehicle moves, the control device 100b of the vehicle controls the steering device 102 according to the target steering angle.

The following is a more concrete explanation. While, in step S210 of the first embodiment, it is arranged for the control device 100a to calculate the target steering angle and the target speed on the basis of the target path that has been generated in step S205, in other words on the basis of the forward path and the backward path, with the semi-automatic parking operation device of this second embodiment, when movement is started in step S1215, for example, the control device 100b may calculate the position of the subject vehicle every time a predetermined time interval elapses and may calculate the deviation from the target path, and, on the basis of this deviation, may calculate a steering angle so that the subject vehicle moves along the target path. And the control device 100b outputs a command for the steering angle that has thus been calculated to the steering device 102. According to this type of control, the vehicle moves along the target path from the parking start position to the parking end position.

In step S1217, the control device 100b makes a decision as to whether or not the position of the subject vehicle is the deceleration start position. Since in this second embodiment, as described above, the position of the subject vehicle is obtained and deviation from the target path is calculated in real time, accordingly it is possible to determine whether or not the subject vehicle position that has thus been calculated has arrived at the deceleration start position. And, if the position of the subject vehicle is the deceleration start position, then the control device 100b transfers the flow of control to step S218 of FIG. 12; whereas, if the position of the subject vehicle is not the deceleration start position, then the flow of control is transferred to step S1219. The subject vehicle position may be detected on the basis of the movement due to the speed of the vehicle and the steering amount.

In step S1219, the control device 100b makes a decision as to whether or not the position of the subject vehicle that has been calculated has arrived at the target stop position. And, if it has arrived at the target stop position, then audio guidance such as "Arrived at the target stop position" is provided via audio.

It should be understood that it would also be acceptable to generate a bird's eye view image on the basis of an image acquired from the external environment recognition device 101, and to arrange for the detection of the deceleration start position and the target stop position to be performed by making a decision as to whether or not the subject vehicle has arrived at the target stop position on the basis of the current position of the vehicle in this bird's eye view image.

According to the second embodiment as explained above, the following beneficial operational effects are obtained.

(1) With this parking assistance device, it is arranged: to perform steering control so as to move the subject vehicle along a target path toward a recognized parking space; when an obstacle that is approaching the subject vehicle has been detected, to calculate a collision position at which the subject vehicle will collide with the obstacle; and to output an alarm upon arrival at an alarm position that is a position upon the target path before the collision position, and that is a margin distance before the collision position set according to the driving behavior of the subject vehicle. Accordingly, it is possible to output an alarm when during automatic parking control a collision with an obstacle is predicted and the subject vehicle is stopped, so that no sense of discomfort is imparted to the driver.

(2) With this control device 100b, the collision position is a position at which the predicted progression path of the obstacle and the target path intersect, and furthermore is a position at which the subject vehicle and the obstacle arrive approximately simultaneously. Accordingly, there is no need to detect an obstacle that is approaching the subject vehicle during driving for automatic parking, since it is possible to detect an obstacle with which there is a possibility of collision in advance, before driving for parking starts.

(3) Since it is arranged to detect the parking space and the obstacle on the basis of an image of the surroundings of the subject vehicle that is acquired by a camera, accordingly it is possible to build this device cheaply, as compared with an obstacle detection device that operates by radar or the like.

(4) The target path includes the forward path along which the subject vehicle is moved forward from its current position to the changeback position, and the backward path along which the subject vehicle is moved backward from the changeback position to the parking space, and the driving behavior is either moving forward or moving backward. And the margin distance upon the backward path is set to be greater than the margin distance upon the forward path. Accordingly it is possible to stop the vehicle at a stop position before stopping at the obstacle without imparting any sense of discomfort to the driver, just as when the driver himself is performing driving for parking.

(5) The target path includes the forward path along which the subject vehicle is moved forward from its current position to a changeback position, and the backward path along which the subject vehicle performs both motion in a straight line and turning while being moved backward from the changeback position to the parking space, and the driving behavior is either moving in a straight line or turning. And the margin distance upon the turning path is set to be greater than the margin distance upon the straight line path. Accordingly it is possible to stop the vehicle at a stop position before stopping at the obstacle without imparting any sense of discomfort to the driver, just as when the driver himself is performing driving for parking.

The embodiments that have been explained above may be implemented in the following variant ways.

Variant Embodiment #1

In the embodiments described above, the external environment recognition device 101 included four onboard cameras; but it would also be acceptable to arrange to utilize some other configuration. For example, it would be possible to employ radar that measures the distance to an object by using millimeter waves, or a laser, or sonar that measures the distance to an object that is present in the surroundings of the subject vehicle by using ultrasound, or the like. If radar or sonar is used for the external environment recognition device 101, then information related to the distance to the object to be measured and its direction may be outputted to the control device 100a by using a dedicated line or the like. Furthermore, if onboard cameras are used as the external environment recognition device 101, then the number thereof is not limited to being four. Any number of cameras from one to many will be acceptable, provided that it possible to capture images of the entire surroundings of the subject vehicle.

Variant Embodiment #2

In the embodiments described above, as the movement direction of the subject vehicle, it was arranged for the vehicle movement direction determination unit 4 to detect information related to moving forward, moving backward, moving in a straight line, or turning of the subject vehicle. However, if the vehicle movement direction determination unit 4 has detected the movement direction of the subject vehicle as being turning, it would also be acceptable to arrange for the detection process to discriminate between turning to the right and turning to the left. It would be possible to arrange for the vehicle control unit 5 to change the value of TURNGAIN according to whether, at the predicted collision position, the subject vehicle will be turning to the right or turning to the left. For example, if the subject vehicle is a right hand drive vehicle, then it is difficult for the driver visually to check the surroundings on the left side of the vehicle when the vehicle is turning to the left. Due to this, the vehicle control unit 5 may set the value of TURNGAIN during turning to the left to be higher than the value of TURNGAIN during turning to the right. On the other hand, if the subject vehicle is a left hand drive vehicle, then, when the subject vehicle is turning to the right, the vehicle control unit 5 may set the value of TURNGAIN during turning to the right to be higher than the value of TURNGAIN during turning to the left.

Variant Embodiment #3

In the embodiments described above, the operation of automatic parking control devices according to the present invention was explained by citing examples when the subject vehicle entered into a parking area and performed backwards parking. However, by employing similar processing, the automatic parking control device according to the present invention will be able to stop the subject vehicle so as not to impart any sense of discomfort to the driver, even if the subject vehicle is required to perform parking in some other way. For example, the subject vehicle may be guided provided that the environment is such that it is possible to establish any type of parking path, whether parallel parking is to be performed, or the subject vehicle is to be parked by moving forward, or the subject vehicle is to be parked in a garage of a private residence, or the like. Moreover, even if the subject vehicle is to be parked in some other way, it is possible to stop the subject vehicle so as not to impart any sense of discomfort to the driver by changing the margin distance according to the direction of progression of the vehicle.

Variant Embodiment #4

In the embodiments described above, the surrounding environment recognition unit 1 recognized the parked vehicles 302 and the pylons 305 as being rectangular, recognized the parking box lines 303 and the vehicle stops 304 as being line segments, and recognized the pedestrian 306 as being a point 316. However, the methods for recognition of various objects by the surrounding environment recognition unit 1 are not limited to these methods. For example it would also be acceptable to arrange to recognize parked vehicles as being any shapes other than rectangles, such as polygons or ellipses or the like, and it would also be acceptable to recognize pedestrians as being circles rather than points.

Variant Embodiment #5

In the first embodiment, it was arranged for the vehicle control unit 5 to output a target steering torque to the steering device 102 for implementing the target steering angle, and to output a target engine torque and/or a target brake pressure to the drive device 103 and/or the braking device 104 for implementing the target speed. However, it would also be acceptable to arrange for the vehicle control unit 5 to output the target steering angle just as it is to the steering device 102, and to output the target speed just as it is to the drive device 103 and/or the braking device 104. In a similar manner, it would also be acceptable to arrange for the vehicle control unit 1002 of the second embodiment to output the target steering angle just as it is to the steering device 102.

Variant Embodiment #6

In the first embodiment, it was arranged for the vehicle control unit 5 to set TURNGAIN to 1 when the subject vehicle was moving in a straight line, and to set TURNGAIN to 1.2 when the subject vehicle was turning. However, the method for setting TURNGAIN is not limited only to this method. For example, it would also be acceptable to arrange to set TURNGAIN to 1 if the steering angle of the subject vehicle is less than 5°, to increase TURNGAIN from 1 to 1.2 linearly if the steering angle of the subject vehicle is greater than or equal to 5° and less than 20°, and to set TURNGAIN to 1.2 if the steering angle of the subject vehicle is greater than or equal to 20°. In a similar manner, with the alarm control unit 1003 of the second embodiment, it would also be acceptable to arrange to set TURNGAIN to 1 if the steering angle of the subject vehicle is less than 5°, to increase TURNGAIN from 1 to 1.2 linearly if the steering angle of the subject vehicle is greater than or equal to 5° and less than 20°, and to set TURNGAIN to 1.2 if the steering angle of the subject vehicle is greater than or equal to 20°.

Moreover, although in the embodiments described above it was arranged for the margin distance DIST to be calculated by multiplying together STDDIST, BACKGAIN, and TURNGAIN, it would also be acceptable to arrange to calculate DIST by adding together STDDIST, BACKGAIN, and TURNGAIN.

Variant Embodiment #7

In the second embodiment, it was arranged for the alarm control unit 1003 to set the alarm position by just the margin distance DIST before the predicted collision position that had been calculated, and to output an alarm generation command when the subject vehicle arrived at the alarm position. However, it would also be acceptable to arrange for the timing at which the alarm control unit 1003 outputs the alarm generation command to be determined by some method other than use of the margin distance DIST. For example, it would be acceptable to arrange to calculate a predicted collision time point at which the subject vehicle will arrive at the predicted collision position, and to output an alarm generation command a predetermined time interval before this predicted collision time point.

Variant Embodiment #8

In the embodiments described above, when the collision prediction unit 3 was calculating the predicted collision position, it calculated the supposed path under the assumption that the obstacle would move in a straight line and in a constant direction. However, the obstacle is not limited to moving in a straight line and in a constant direction. For example, there is a possibility that a pedestrian may change his direction of progression in order to avoid the subject vehicle, and actually the possibility is not particularly high that he will continue to move in the same direction at a constant speed. Thus, it would also be acceptable to arrange to predict a range of movement for the pedestrian, and thus to predict when and how he will collide with the subject vehicle.

Moreover, there is a danger that an obstacle such as a pedestrian or the like may appear after operation for automatic parking has started in step S215. Thus, it would also be acceptable to arrange for the collision prediction unit 3, after the processing of step S209, also to make decisions in real time as to whether the subject vehicle will collide with any obstacle. And it would be acceptable to arrange for the control device 100a to return the flow of control to step S210 by interrupt processing, if the collision prediction unit 3 predicts that the subject vehicle will collide with some obstacle.

Furthermore it would also be acceptable, if the collision prediction unit 3 has predicted a collision with an obstacle in real time and has performed calculation of the predicted collision position and calculation of the target stop position, to arrange to change the margin distance DIST on the basis of the current direction of movement of the subject vehicle. The current direction of movement of the subject vehicle may be determined by using information acquired from the subject vehicle, such as its gear position and its steering angle and its yaw rate and so on. For example, if the gear position of the subject vehicle is "R (reverse)", then it may be determined that the subject vehicle is moving backward. Moreover, if for example the gear position of the subject vehicle is neither "P (parking)", nor "N (neutral)", nor "R (reverse)", then it may be determined that the subject vehicle is moving forward.

Variant Embodiment #9

While in the second embodiment it was arranged for the control device 100b not to control the speed of the subject vehicle but only to control its steering angle, it would also be acceptable to arrange for the control device 100b not to control the steering angle either. For example, it would also be acceptable to apply the present invention to a parking assistance device that provides guidance for progression direction, vehicle speed, steering direction, and steering amount via audio, so that the subject vehicle progresses along the target path. In this case, if it has been determined that there is a possibility that an obstacle that is approaching the subject vehicle as it proceeds along the target path may collide with the subject vehicle after a predetermined time period, then an alarm may be issued at a position that is just a margin distance before the predicted collision position, this margin distance being set according to whether the vehicle is moving forward, is moving backward, is moving in a straight line, or is turning. Or, it would also be acceptable to arrange to avoid the collision by applying braking automatically.

Variant Embodiment #10

In the embodiments described above, it is arranged to cause the alarm generation command to be generated by the alarm control unit 6 when the fact that the subject vehicle is going to collide with the obstacle is predicted by the collision prediction unit 3, and moreover the position of the subject vehicle is the deceleration start position. However, the timing at which the alarm generation command is caused to be generated by the alarm control unit 6 is not limited to being only when the position of the subject vehicle is the deceleration start position. For example, it would also be acceptable to arrange for the control device 100a and the control device 100b to cause the alarm generation command to be generated by the alarm control unit 6 directly before the position of the subject vehicle reaches the deceleration start position.

The embodiments and variant embodiments explained above are only examples; provided that the essential characteristics of the present invention are preserved, it is not to be considered as being limited by the above details. Moreover, provided that the essential characteristics of the present invention are preserved, the embodiments and variant embodiments explained above may be implemented in various combinations.

The contents of the disclosure of the following application, upon which priority is claimed, are hereby incorporated herein by reference:
Japanese Patent Application No. 2013-220248 (filed on Oct. 23, 2013).

REFERENCE SIGNS LIST

1: surrounding environment recognition unit
2: parking path generation unit
3: collision prediction unit
4, 1001: vehicle movement direction determination units
5, 1002: vehicle control units
6, 1003: alarm control units
100a, 100b: control devices
400: forward path
401: backward path
410: changeback position
411: target parking position
431: supposed path
432: point of intersection
DIST: margin distance

The invention claimed is:

1. An automatic parking control device that:
performs steering control and speed control so that a subject vehicle moves along a target path toward a recognized parking space;
when an obstacle that is approaching the subject vehicle has been detected, calculates a collision position at which the subject vehicle will collide with the obstacle;
on the basis of a margin distance that is set according to the driving behavior of the subject vehicle and the collision position, calculates a stop position upon the target path that is set before the collision position by the margin distance; and
performs speed control so that the subject vehicle stops at the stop position that has been calculated.

2. The automatic parking control device according to claim 1, wherein:
the collision position is a position at which the predicted progression path of the obstacle and the target path intersect, and furthermore is a position at which the subject vehicle and the obstacle arrive approximately simultaneously.

3. The automatic parking control device according to claim 1, wherein:
the parking space and the obstacle are detected on the basis of a captured image of the surroundings of the subject vehicle.

4. The automatic parking control device according to claim 1, wherein:
the target path includes a forward path along which the subject vehicle is moved forward from its current position to a changeback position, and a backward path along which the subject vehicle is moved backward from the changeback position to the parking space;
the driving behavior includes moving forward and moving backward; and
the margin distance upon the backward path between the stop position and the collision position is greater than the margin distance upon the forward path between the stop position and the collision position.

5. The automatic parking control device according to claim 1, wherein:
the target path includes a forward path along which the subject vehicle is moved forward from its current position to a changeback position, and a backward path along which the subject vehicle performs motion in a straight line and turning while being moved backward from the changeback position to the parking space;
the driving behavior includes moving in a straight line and turning; and
the margin distance when the collision position is upon the turning path is set to be greater than the margin distance when the collision position is upon the straight line path.

6. A parking assistance device that:
performs steering control and speed control so as to move a subject vehicle along a target path toward a recognized parking space;
when an obstacle that is approaching the subject vehicle has been detected, calculates a collision position at which the subject vehicle will collide with the obstacle; and
outputs an alarm upon arrival at an alarm position that is a position upon the target path before the collision position, and that is a margin distance before the collision position set according to the driving behavior of the subject vehicle;
on the basis of the margin distance that is set according to the driving behavior of the subject vehicle and the collision position, calculates a stop position upon the target path that is set before the collision position; and
performs speed control so that the subject vehicle stops at the stop position that has been calculated.

7. The parking assistance device according to claim 6, wherein:
the collision position is a position at which the predicted progression path of the obstacle and the target path intersect, and furthermore is a position at which the subject vehicle and the obstacle arrive approximately simultaneously.

8. The parking assistance device according to claim 6, wherein:
the parking space and the obstacle are detected on the basis of a captured image of the surroundings of the subject vehicle.

9. The parking assistance device according to claim 6, wherein:
the target path includes a forward path along which the subject vehicle is moved forward from its current position to a changeback position, and a backward path along which the subject vehicle is moved backward from the changeback position to the parking space;
the driving behavior includes moving forward and moving backward; and
the margin distance upon the backward path between the stop position and the collision position is greater than the margin distance upon the forward path between the stop position and the collision position.

10. The parking assistance device according to claim 6, wherein:
the target path includes a forward path along which the subject vehicle is moved forward from its current position to a changeback position, and a backward path along which the subject vehicle performs motion in a straight line and turning while being moved backward from the changeback position to the parking space;
the driving behavior includes moving in a straight line and turning; and
the margin distance when the collision position is upon the turning path is set to be greater than the margin distance when the collision position is upon the straight line path.

* * * * *